INVENTOR
JOSEPH DENNIS
CHRISTIAN
BY
Irwin S. Thompson
ATTORNEY

United States Patent Office 3,000,229
Patented Sept. 19, 1961

3,000,229
SPEED CHANGE DEVICE
Joseph Dennis Christian, San Francisco, Calif., assignor to Holo-Flite International Incorporated, San Francisco, Calif.
Filed June 3, 1960, Ser. No. 33,688
3 Claims. (Cl. 74—421)

This invention relates to speed change devices of the kind wherein a specified reducing gearing is connected between a prime mover and a machine to be driven. It is known to couple the prime mover to the gearing by a flexible coupling and to couple to gearing to the machine by a flexible coupling whereby angular misalignment of the axes of the prime mover, gearing, and machine can be accommodated. The gearing usually includes a housing in which an input shaft, an output shaft coaxial with the input shaft, and a countershaft are mounted, the input and output shafts carrying gearwheels meshing with gearwheels on the countershaft. This introduces considerable reaction forces on the countershaft which tend to rotate the countershaft and the housing about the input and output shafts. To obviate this it is known to bolt the gearing housing to the floor but this involves accurate mounting means.

According to the present invention an apparatus for coupling a prime mover shaft to a machine shaft comprises a gearing having a housing containing an input shaft and an output shaft and a countershaft, and gearwheels on the main shaft and output shaft meshing with gearwheels on the countershafts, a flexible coupling connecting the mainshaft with the prime mover shaft, a flexible coupling connecting the machine shaft with the output shaft, and cam means including a part fixed to the housing and a fixed part co-operating therewith for applying a force on the housing offsetting bending loads on the input shaft and output shaft caused by the tooth pressures between the gearwheels, said housing, gearing and couplings being otherwise suspended on said prime mover shaft and said machine shaft. The cam means may be designed to increase the radial force with increasing tooth pressures so as to counter the bending loads as these increase.

The invention will be more fully described by way of example with reference to the accompanying drawings wherein.

Figure 1:
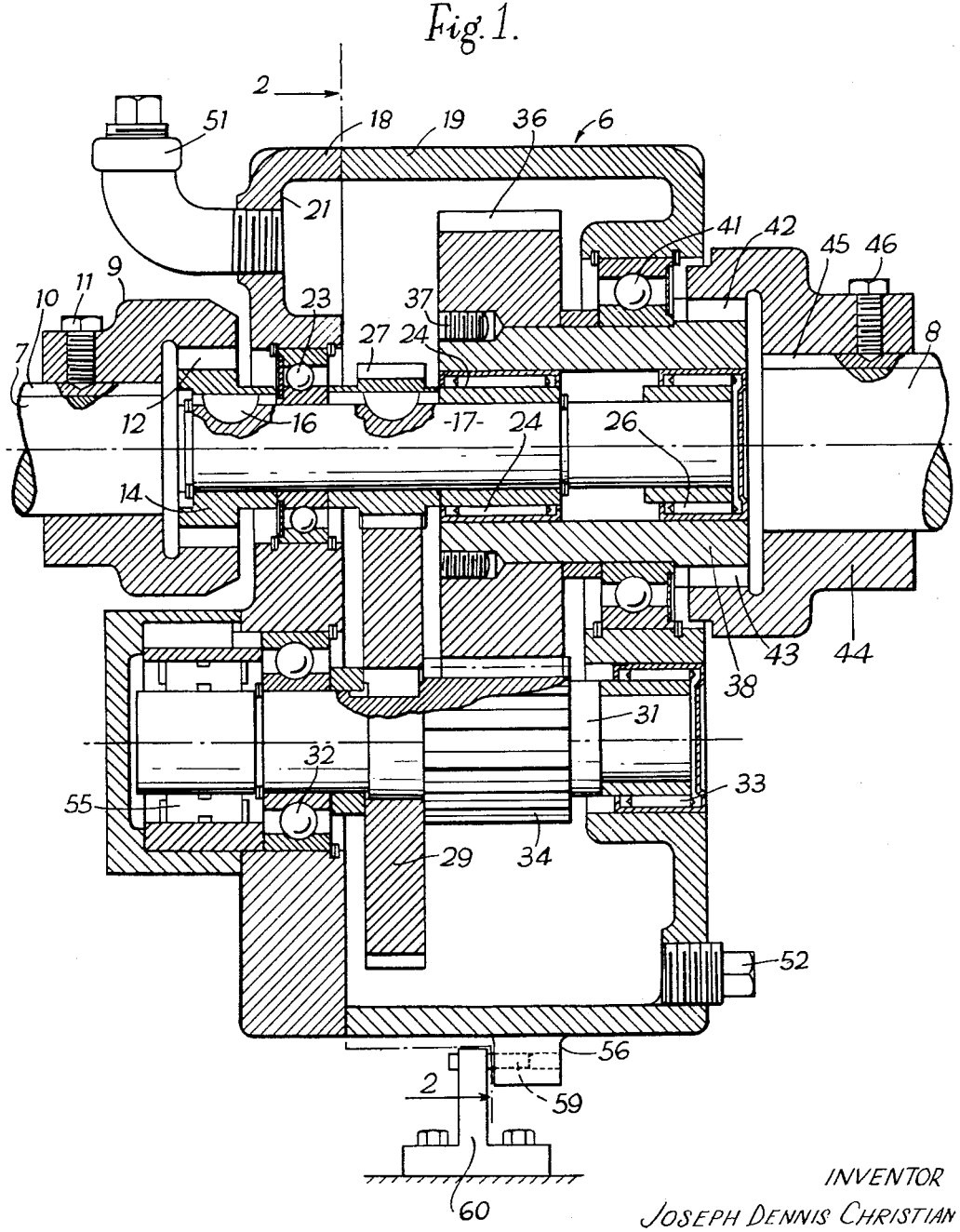
FIGURE 1 is a sectional view of an apparatus made in accordance with the invention.
Figure 2:
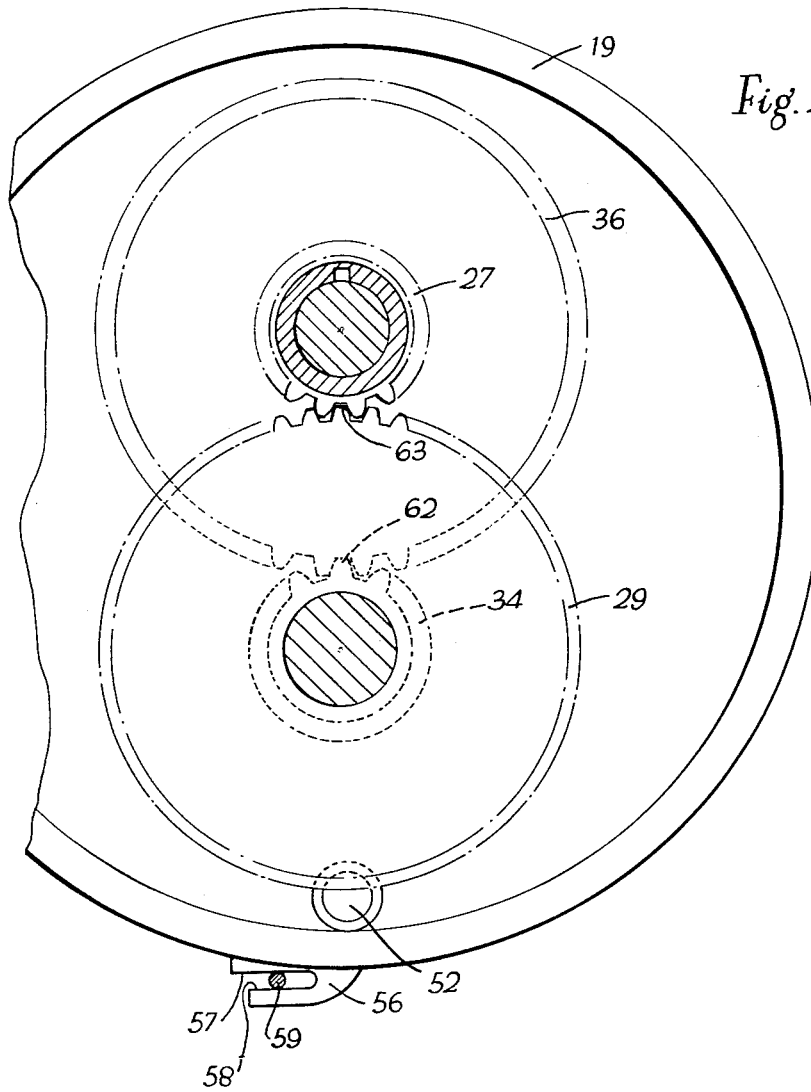
FIGURE 2 is a diagrammatic view in the axial direction.

Referring to FIGURE 1 in the drawing, one form of device embodying the present invention is indicated generally by the numeral 6 and is shown as mounted between the input shaft 7 of a suitable prime mover, such as an electric motor, and a shaft 8 connected to a machine or device to be driven. The connection to the input shaft 7 is by a flexible coupling 9 mounted upon the shaft 7 and secured in place by key 10 and set screw 11. At one end, the flexible coupling 9 is provided with an internal gear 12, the latter fitting upon a matching spur gear 14 secured by key 16 to an input shaft 17. The teeth of the gears 12, 14 are designed in known manner to permit misalignment of the shafts 7, 17.

To provide support for the input shaft and various other units, as will be described, a suitable casing structure is provided. For convenience, this is shown as made in two parts, 18 and 19, suitably joined together and including opposite spaced walls 21 and 22. The input shaft 17 is mounted in wall 21 by ball bearing 23; it is also supported for rotation by needle or roller bearings 24 and 26, these being supported, as will be presently described.

To provide for a reduction in speed between the input shaft 17 and the output shaft 8, a high speed pinion gear 27 is secured by key 28 to the shaft 17. The pinion gear 27 is in mesh with a high gear 29, secured in turn to counter shaft 31. The counter shaft is supported by ball bearing 32 in wall 21 and by a needle or roller bearing 33 in the wall 22.

Mounted upon the shaft 31 is a low speed pinion 34 driving a larger low speed gear 36, the latter being secured by screw dowels 37 upon an annulus 38, in which the aforementioned needle bearings 24 and 26 on the high speed shaft 17 are supported. Since shafts 17 and annular shaft 38 rotate in the same direction, the rotational speed effective in bearings 24 and 26 is the difference between the two. As a result, the load on bearings 24 and 26 is greatly reduced and much smaller bearings can be employed as compared to these required when the shafts are not so supported.

The annular member 38 is supported in wall 22 by the ball bearings 41. At its outer end, the annular member includes a spur gear 42 which is, in turn, in mesh with an internal gear 43 in a flexible coupling member 44, the latter being secured by key 45 and set screw 46, on the end of the shaft 8.

To provide for suitable lubrication of the several gears in the casing, a filling connection is provided at 51 and a lubricant drain is provided by plug 52. A back stop 55 is mounted on an end of shaft 31 to permit that shaft to rotate in only one direction. Such uni-direction devices are conventional in the art.

At the lower part of the casing 19 a cam block 56 is fixed which has upper and lower inclined cam surfaces 57, 58. A pin 59 is located between these surfaces. This pin is mounted on a bracket 60 fixed to the floor.

Assuming that gearwheels or pinions 27, 34 and gearwheels 29, 36 are rotating in the directions shown by the arrows, the tooth pressures at 62, 63 will produce a torque reaction on the countershaft bearings tending to rotate the gearing housing in the direction of the arrow 60. At the same time the tooth pressures produce a bending load downwards on the shafts 7, 17, 8. The torque on the housing in the direciton 60 causes the cam surface 57 to react on the pin 59 and develop a force radially of the shaft 17 which offsets the bending loads to an increasing extent as the tooth pressures and torque reaction increase.

If the gears rotate in the opposite directions the housing has a reaction torque thereon in the direction opposite to the arrow 60 and the cam surface 58 then comes into play to produce the required offsetting force radially of the shaft 17.

The offsetting force may not be wholly radial but will at least have a large radial component.

Figure 3:
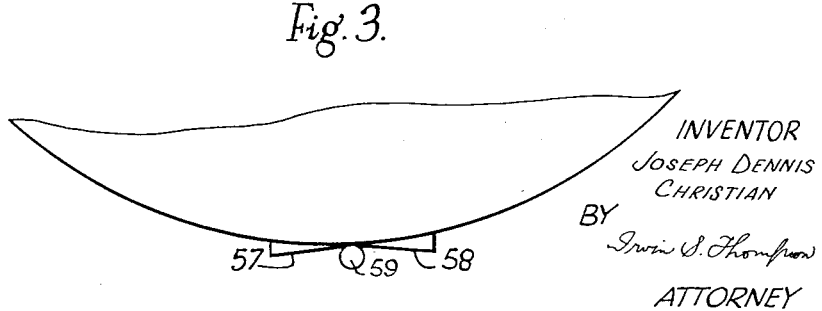
FIGURE 3 shows a detail of a modification to be described.

As shown in FIGURE 3 the cam surfaces may be arranged on opposite sides of a plane containing the axis of the shaft 17 and the axis of the pin.

I claim:

1. A speed change device for coupling a prime mover shaft to a machine shaft comprising a gearing having a housing containing an input shaft and an output shaft and a countershaft, and gearwheels on the main shaft and output shaft meshing with gearwheels on the countershaft, a flexible coupling connecting the mainshaft with the prime mover shaft, a flexible coupling connecting the machine shaft with the output shaft, and cam means including a part fixed to the housing and a fixed part co-operating therewith for applying a force on the housing offsetting bending loads on the input shaft and output shaft caused by the tooth pressures between the gearwheels, said housing, gearing and couplings being otherwise suspended on said prime mover shaft and said machine shaft.

2. A speed change device as claimed in claim 1 wherein said cam means includes a cam block on the underneath of the housing, having a cam surface engaging a projection on the fixed part.

3. A speed change device as claimed in claim 1 wherein the cam means are adapted for operation in either rotary direction of the housing about the input and output shafts.

References Cited in the file of this patent

UNITED STATES PATENTS

| | | |
|---|---|---|
| 1,629,180 | Smith | May 17, 1927 |
| 1,674,200 | Gotten | June 19, 1928 |
| 2,504,066 | Christian | Apr. 11, 1950 |
| 2,596,794 | Schmitter | May 13, 1952 |